Figure 1:
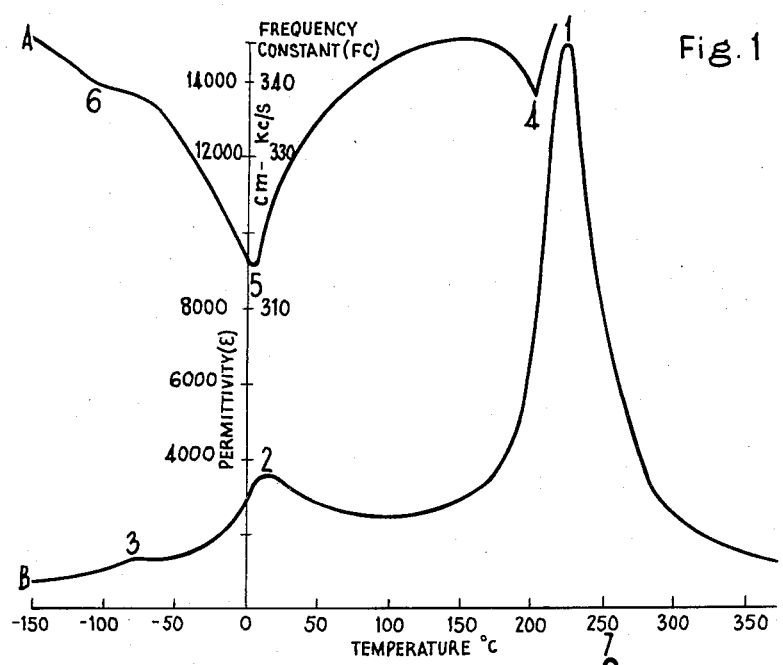

Dec. 16, 1958  B. LEWIS  2,864,713
CERAMIC DIELECTRIC COMPOSITIONS
Filed Sept. 4, 1956

INVENTOR: BRIAN LEWIS
ATTORNEYS

United States Patent Office 2,864,713
Patented Dec. 16, 1958

2,864,713

CERAMIC DIELECTRIC COMPOSITIONS

Brian Lewis, Ruislip, England, assignor to The General Electric Company Limited, London, England Application September 4, 1956, Serial No. 607,779

Claims priority, application Great Britain September 9, 1955

15 Claims. (Cl. 106—39)

This invention relates to ceramic dielectric compositions, and is more particularly, but not exclusively, concerned with compositions of the kind, generally referred to as "ferroelectric materials," possessing the property of ferroelectricity, and capable of being electrically permanently polarised to produce piezoelectric bodies suitable for use in the construction of electromechanical transducers. The invention also relates to such piezoelectric bodies and transducers.

It is known that certain ceramic dielectric materials possess peculiar dielectric properties, in that the permittivity increases with increase in temperature, up to a more or less clearly defined maximum, and decreases rapidly if the temperature is raised further. The temperature at which the maximum value of the permittivity is obtained is known as the "Curie point" and it has been found that in the cases of materials which behave in this manner, a transition in crystal structure takes place at the Curie point. These materials are ferroelectric at temperatures below the Curie point, but not at higher temperatures; thus at temperatures below the Curie point such materials are capable of being electrically polarised to develop remanent piezoelectric properties which render such materials useful as the operative elements in electromechanical transducers and like devices. A measure of the piezoelectric activity of a dielectric material is conveniently given by the so-called electromechanical coupling coefficient, which is expressed as a fraction equal to the square root of the ratio of the energy stored in the dielectric material in mechanical form to the total exciting electrical energy applied to the material, and is shown as a percentage.

These ferroelectric materials usually exhibit one or more secondary transition points, at temperatures below the Curie point, at which further changes in crystal structure occur: such a secondary transition point is usually characterised by a maximum in the permittivity-temperature curve and a minimum in the resonant frequency—temperature curve for the material, but there is not necessarily any marked effect on the ferroelectric properties of the material as it is taken through such a secondary transition point.

The best known ferroelectric ceramic materials of the kind referred to above are the materials consisting mainly of barium titanate, with which other materials, for example other alkaline earth metal titanates, may be combined for obtaining desired modifications of the dielectric and ferroelectric properties.

It is also known that combinations of certain metal oxides with niobium pentoxide and with tantalum pentoxide exhibit dielectric and/or ferroelectric properties analogous in some respects to the properties of the barium titanate materials. Compounds of this kind which have been described include alkali metal metaniobates, for example those having the chemical formulae $NaNbO_3$, $KNbO_3$ and $LiNbO_3$, and the corresponding tantalates; alkaline earth metal niobates, for example those having the chemical formulae $BaNbO_3$, $Ba_2Nb_2O_7$, and the corresponding compounds of calcium and strontium; and niobates of zinc, cadmium and lead, for example those having the chemical formulae $Zn_2Nb_2O_7$, $Cd_2Nb_2O_7$, $Pb_2Nb_2O_7$ and $PbNb_2O_6$. Some of these compounds are capable of being electrically polarised to give materials having useful piezoelectric properties.

The individual niobate and tantalate compounds mentioned above do not always possess exactly those properties which are desired for any particular application. For example, for some purposes it may be desirable to modify the properties of an individual niobate or tantalate compound by increasing its permittivity over any given temperature range, or by rendering its permittivity and resonant frequency substantially constant over a desired temperature range, or by increasing its electromechanical coupling coefficient, or by raising or lowering its Curie point or other transition temperatures. For obtaining ceramic materials having electrical properties which are desired modifications of those of some of the niobate compounds mentioned above, it has been proposed to form combinations of one of these niobate compounds with other dielectric materials, for example with another niobate or with barium titanate.

Thus it has been shown that if the cadmium niobate having the chemical formula $Cd_2Nb_2O_7$ is combined with sodium metaniobate to form a ceramic material consisting of a solid solution of the two niobates, the properties of the pure sodium metaniobate are modified in that the Curie temperature is lowered to an increasing extent as the cadmium niobate content is increased, and the permittivity is increased with increasing cadmium niobate content up to a maximum for the compound in which the ratio of $NaNbO_3:Cd_2Nb_2O_7$ is 85:15, by weight.

It is one object of the present invention to provide ceramic materials consisting wholly or mainly of combinations of one or more alkali metal niobates with one or more niobates of other metals, which materials can be so constituted as to possess improved dielectric and/or ferroelectric properties in comparison with the properties of niobate ceramic materials which have previously been described.

According to the invention a ceramic dielectric material has a stoichiometric composition substantially corresponding to the formula $(1-x)$ $L_2O.xMO.R_2O_5$, wherein L is sodium which may be partially replaced by potassium, M is cadmium and/or lead, R is niobium which may be partially replaced by tantalum, and $x$ has a value in the range of 0.05 mole to 0.80 mole, L consisting wholly of sodium if lead is present.

Preferably the proportion of the sodium oxide replaced by potassium oxide, if any, is not greater than 50 mol. percent, the most suitable proportions being not greater than 20 mol. percent, and the proportion of niobium pentoxide replaced by tantalum pentoxide, if any, is not greater than 25 mol. percent.

The preferred values for $x$ in the above formula vary according to the identity of the components L and M in the said formula. For example, for materials in which L is sodium only and M is cadmium only, $x$ is preferably in the range of 0.15 to 0.30 mole, the optimum value being 0.25 mole, and for materials in which L is sodium only and M is lead only, the preferred range of values for $x$ is 0.25 to 0.35 mole. The electrical properties of the materials vary with changes in the value of $x$, and also with variations in the identity of the components L, M and R: the nature of these variations in properties will be described hereinafter.

The materials according to the invention each consist of or contain a phase which may be regarded as a solid solution of sodium metaniobate, $NaNbO_3$ (with or without the corresponding potassium compound) and cadmium and/or lead metaniobate, $CdNb_2O_6$, $PbNb_2O_6$; in these solid solution phases up to 25 mol. percent or more, of the niobium pentoxide may be replaced by tantalum pentoxide as aforesaid. Thus the composition of these phases may be expressed in another way by the formula: $(1-x)2LRO_3.xMR_2O_6$. It is believed that the solid solutions are formed by the introduction of cadmium and/or lead atoms into the perovskite-type crystal structure of the sodium metaniobate, each cadmium or lead atom replacing two sodium atoms; any potassium, or tantalum atoms present are also incorporated in the sodium metaniobate crystal structure, the potassium atoms replacing sodium atoms, and the tantalum atoms replacing niobium atoms. The solid solution phases are thus characterised by the perovskite-type crystal structure in a more or less distorted form according to the proportions of cadmium and/or lead atoms, and atoms of potassium, and tantalum, if any, which are included.

Some of the materials in accordance with the invention, in which $x$ has a relatively low value, are composed substantially wholly of a single phase consisting of a solid solution as aforesaid; in other materials in accordance with the invention, however, in which $x$ has a relatively high value, one or more other phases are usually present in addition to the solid solution phase. Thus the other phases contain the excess of cadmium oxide and/or lead oxide over the amounts which will go into solid solution in the sodium niobate and probably consist of niobates, with or without minor proportions of tantalates, of either the type $CdNb_2O_6$, $PbNb_2O_6$, or the type $Cd_2Nb_2O_7$, $Pb_2Nb_2O_7$, or of mixtures of these types, depending upon the relative proportions of the constituent oxides present in the material. The limiting value of $x$ for which complete solid solution of the cadmium oxide and/or lead oxide in the sodium niobate (or sodium niobate-tantalate) is obtained differs for materials containing cadmium only, lead only, or both of these elements in varying proportions, and also varies with variations in the proportion of the sodium which is replaced by potassium. For example for materials composed only of the oxides of sodium, cadmium and niobium, the limiting value of $x$ for complete solid solution is approximately 0.25 mole, giving a compound of the formula $$0.75Na_2O.0.25CdO.Nb_2O_5$$

and for materials composed only of the oxides of sodium, lead and niobium, the limit of solid solution occurs when $x$ is approximately 0.35 mole, giving a compound of the composition $0.65Na_2O.0.35PbO.Nb_2O_5$.

In general, optimum electrical properties are obtained with materials consisting substantially of a single solid solution phase in which the value of $x$ is in the region of the limit for complete solid solution. In materials of compositions such that the value of $x$ is higher than this limiting value, the additional phases present, composed of cadmium niobates or lead niobates (or niobate-tantalates), are characterised by different crystal structures from that of the solid solution phase and possess different electrical properties. The phases of composition $Cd_2Nb_2O_7$ and $Pb_2Nb_2O_7$ possess a cubic crystal structure of the "fluorite" type, while the metaniobate phases, $CdNb_2O_6$ and $PbNb_2O_6$ possess orthorhombic crystal structures. These additional phases thus have a diluent effect on the solid solution phase, with consequent modification of the electrical properties of the material. In cases where $x$ has a very high value, the crystal structure of the cadmium metaniobate or lead metaniobate may predominate over the perovskite structure of the solid solution phase: for example in the case of sodium lead niobate in which $x$ has a value greater than 0.75 mole, the predominant phase appears to possess a modified lead metaniobate type of crystal structure.

A ceramic dielectric material in accordance with the invention may be prepared by forming a mixture of the constituent oxides, or of suitable combinations of such oxides, or of compounds decomposable by heat to form the oxides, in a finely divided state, subjecting the mixture to sufficiently high pressure to produce a coherent compact, and heating the compact at a temperature and for a time such that the mixture is sintered to form a dense body. The heating may be carried out in air or in oxygen or, in the case of materials containing cadmium oxide, in a mixture of air and cadmium oxide vapour. If desired a preliminary heating or presintering step may be carried out at a lower temperature. This pre-sintering step is preferably carried out at temperatures in the range of 1000° C. to 1100° C. and the final sintering is preferably carried out at temperatures in the range of 1100° C. to 1350° C., materials containing potassium being sintered at 1100° C. to 1150° C.

Careful control of the firing conditions is usually necessary to ensure, as far as possible, that the final product has substantially the same stoichiometric composition as the initial mixture of oxides (for example, unless suitable precautions are taken, cadmium oxide tends to volatilise), that the product has the desired electrical properties, and that a well-sintered dense, homogeneous product of low porosity is obtained. It may be noted that when one or both of the oxides of potassium and tantalum are to be incorporated in the material, the firing conditions are more critical since the inclusion of these oxides renders the production of a well-sintered material more difficult. However in spite of the comparative difficulty of preparing materials containing potassium or tantalum, minor additions of those constituents are in some cases desirable since they may confer certain advantages upon the properties of the product, as will be explained more fully hereinafter.

In one method of manufacturing a ceramic dielectric material in accordance with the invention, a mixture of the constituent oxides and/or carbonates or other compounds decomposable by heat to form the oxides is ground, or preferably is milled under acetone, and is pressed with a temporary binder into blocks which are then prefired at a temperature in the range of 1000° C. to 1100° C. which will result in some sintering without excessive shrinkage; the prefined blocks are ground or milled to powder, which is pressed to form compacts of the required shapes, and the compacts are sintered at a temperature somewhat higher than that at which the prefiring step is carried out.

In an alternative method of manufacturing a material according to the invention, the constituent metaniobates (and optionally metatantalates) are first preformed from the appropriate oxides or decomposable compounds, and are then milled together in the required proportions to give a powdered mixture which is pressed and sintered to give a product of the desired shape and size. For example, for the preparation of a sodium cadmium niobate material, sodium metaniobate and cadmium metaniobate may be preformed separately: sodium metaniobate is made by pressing a milled mixture of sodium carbonate and niobium pentoxide in equimolar proportions with a small proportion of a temporary binder, and heating at 1000° C. for one hour or longer, and cadmium metaniobate, $CdNb_2O_6$, is similarly prepared from a mixture of cadmium oxide and niobium pentoxide in equimolar proportions. The products thus obtained are mixed together in the desired proportions for any particular composition of the formula $$(1-x)Na_2O.xCdO.Nb_2O_5$$

and the mixture is milled under acetone to give a powder of small particle size. The mixed powder, to which a temporary binder is added, is subjected to a pressure of, for example, 12 tons/square inch to form compacts of any desired shape, and the compacts are fired at 1250° C. in a closed vessel which may also contain pressed discs of cadmium oxide, so that sintering of the product is effected in an atmosphere consisting of a mixture of air and cadmium oxide vapour.

It is usually immaterial which of the two methods described above is employed, the particular method selected for the preparation of any given material being merely a matter of convenience.

The ceramic materials in accordance with the invention possess advantageous dielectric properties and most of these compositions are also ferroelectric, the specific values of permittivity and electromechanical coupling coefficient varying considerably with variations in the composition of the materials. Thus one of the advantages of the invention is that a selection can be made from a series of materials of varying compositions to obtain a material having desired properties for a given purpose. As indicated above, the presence of an additional phase or phases containing excess cadmium oxide and/or lead oxide in admixture with a solid solution double niobate or (niobate-tantalate) phase results in modification of the electrical properties characterisitc of the solid phase alone. For example we have found that the presence of excess cadmium oxide results in a reduction of the permittivity, density and electromechanical coupling coefficient of a sodium cadmium niobate material; hence if the material is sintered in at atmosphere containing cadmium oxide vapour, it is desirable to prevent excessive absorption of cadmium oxide by the material during sintering. On the other hand we have found that the presence of excess niobium pentoxide is apparently immaterial, and in some cases the inclusion of up to 20 mol. percent excess $Nb_2O_5$ in the initial mixture used for preparing the materials is desirable for preventing the formation of an additional phase, especially in the case of sodium lead niobate materials. We have also found that the presence of excess lead oxide, and a deficiency of niobium pentoxide, are both undesirable. The minor porportions of potassium oxide or tantalum oxide which may be included in the materials may modify the properties of the materials in some respects.

It may be noted that no sharp transitions in properties occur with changes in the compositions of the materials. The properties change gradually as the proportions of the various constituents are increased or decreased, owing to the coexistence of different phases, some of which are ferroelectric and some anti-ferroelectric, in varying proportions.

The ceramic dielectric materials in accordance with the present invention are characterized by high permittivities over a relatively wide temperature range. Some of these materials possess maximum permittivities, that is to say the permittivities at the Curie point, which are considerably in excess of those of the niobate dielectric materials which have been previously described. For example the sodium cadium niobate of the formula $0.75Na_2O.0.25CdO.Nb_2O_5$ has a permittivity of approximately 15,000 at the Currie point, whereas the maximum permittivity of the previously described sodium cadmium niobate materials, in which the cadmium niobate is of the form $Cd_2Nb_2O_7$, is a little over 11,000 for the compound consisting of sodium niobate and cadmium niobate in the ratio of 85:15 by weight. The permittivity of the materials of the invention varies with different values of $x$, and is highest for materials of the compositions representing the limits of solid solution. The replacement of cadmium by lead, and the replacement of sodium by potassium, both result in a reduction of the permittivity of these materials; the introduction of tantalum in place of part of the niobium reduces the maximum permittivity of any given material, but at any specified temperature the permittivity may be either reduced or increased, an increase occurring at room temperature with relatively large proportions of tantalum by virtue of the marked lowering of the Currie temperature which results from the introduction of tantalum into these materials.

Materials in accordance with the invention which are composed of the oxides of sodium, cadmium and niobium and in which $x$ has a value in the range of 0.05 mole to 0.5 mole have been found to be ferroelectric, that is to say are capable of being polarised electrically to give materials having useful piezoelectric properties, the radial electromechanical coupling coefficient for this series of materials again increasing with increasing values of $x$ up to a maximum of 30% or higher when $x = 0.25$ mole, that is to say at the limit of solid solution. These materials may again be compared with the previously described sodium cadmium niobates in which the cadmium component is of the form $Cd_2Nb_2O_7$: in the latter series we have found that the maximum radial electromechanical coupling coefficient is 21% for the material of the composition $0.80Na_2O.(0.20)2CdO.Nb_2O_5$. The sodium lead niobates in which $x$ has values in the range of about 0.1 to 0.4 mole are ferroelectric, but their electromechanical coupling coefficients are not in general as high as in the case of the cadmium compounds, the highest values usually being obtained when $x$ is between 0.25 and 0.35 mole. Materials containing potassium in partial substitution for the sodium or tantalum in partial substitution for the niobium, in general have lower values of electromechanical coupling coefficient, but may be advantageous in other respects, as for example in showing a smaller variation of properties over particular temperature ranges. All these materials may be permanently polarised by the well-known method of applying a unidirectional electric field, to produce piezoelectric bodies which may be employed in the construction of electromechanical transducers. The strength of the applied field is usually of the order of 20 to 30 kv./cm., the time of application of the field, and the temperature at which polarisation is effected, varying somewhat for different compositions.

The incorporation of cadmium metaniobate and/or lead metaniobate in solid solution in sodium metaniobate, in accordance with the invention, in most cases causes a reduction in the Curie temperature of the material compared with that of pure sodium metaniobate, the Curie temperature decreasing as the value of $x$ increases. The introduction of lead metaniobate produces a reduction in the Curie temperature similar to that produced by cadmium metaniobate, until the value of $x$ becomes so high that the lead metaniobate crystal structure becomes predominant, and then there is a sudden increase in the Curie temperature. Pure sodium metaniobate changes from an orthorhombic crystal form to a tetragonal form at the Curie point, and the introduction of the cadmium and lead compounds results in the formation of a new tetragonal phase below the Curie temperature, the orthorhombic phase being displaced to lower temperatures, so that a secondary transition temperature exists below the Curie temperature: this secondary transition temperature is reduced as the cadmium/lead content is increased. If the sodium is partially replaced by potassium, both the Curie temperature and the secondary transition temperature are raised, whereas the replacement of part of the niobium by tantalum reduces both these temperatures very considerably: for example the replacement of 25 mol. percent of the niobium by tantalum in the material of composition $0.75Na_2O.0.25CdO.Nb_2O_5$ reduces the Curie temperature to approximately room temperature, so that the maximum permittivity of this material occurs at room temperature, a fact which may be of great value for some applications.

The effects of potassium and tantalum on the transition temperatures of these materials can be turned to great practical advantage, especially in modifying materials whose secondary transition temperature is in the region of room temperature and which thus show undesirable variations in permittivity and resonant frequency over a small temperature range in this region. For example the material $0.75Na_2O.0.25CdO.Nb_2O_5$, which has the highest permittivity and electromechanical coupling coefficient of the sodium cadmium niobate series, shows a secondary transition at a temperature near normal room temperature, but by the substitution of relatively small proportions of potassium or tantalum for sodium or niobium respectively, the secondary transition temperature is respectively raised above or reduced below the room temperature region, and the permittivity and resonant frequency are thus rendered substantially constant over a temperature range around room temperature. Similar considerations apply if the operating temperature for any particular application is not near room temperature: thus if the particular material which it is desired to use has a transition temperature in the region of the operating temperature the material can be modified by the incorporation of either potassium or tantalum to raise or lower the transition temperature to a suitable extent and to reduce or eliminate variations in the electrical properties over the desired temperature range. Furthermore, the replacement of part or all of the cadmium by lead also results in a reduction in the amount of variation of the electrical properties with changes in temperature in the region of the secondary transition temperature.

To illustrate the manner in which the electrical properties of the materials in accordance with the invention vary with temperature, the permittivity-temperature and frequency constant-temperature curves of two specific materials, in the sodium cadmium niobate series and sodium lead niobate series respectively, are shown in the accompanying drawing by way of example. The measurements from which the curves were drawn were made on thin discs of the materials, and the "frequency constant" referred to herein is the product of the resonant frequency in the radial mode and the diameter of the disc, expressed in centimetrekilocycles per second.

Referring to the drawing, Figure 1 shows the frequency constant-temperature curve (A) and the permittivity-temperature curve (B) for a specimen of sodium cadmium metaniobate of the composition $$0.75Na_2O.0.25CdO.Nb_2O_5$$

Figure 2:
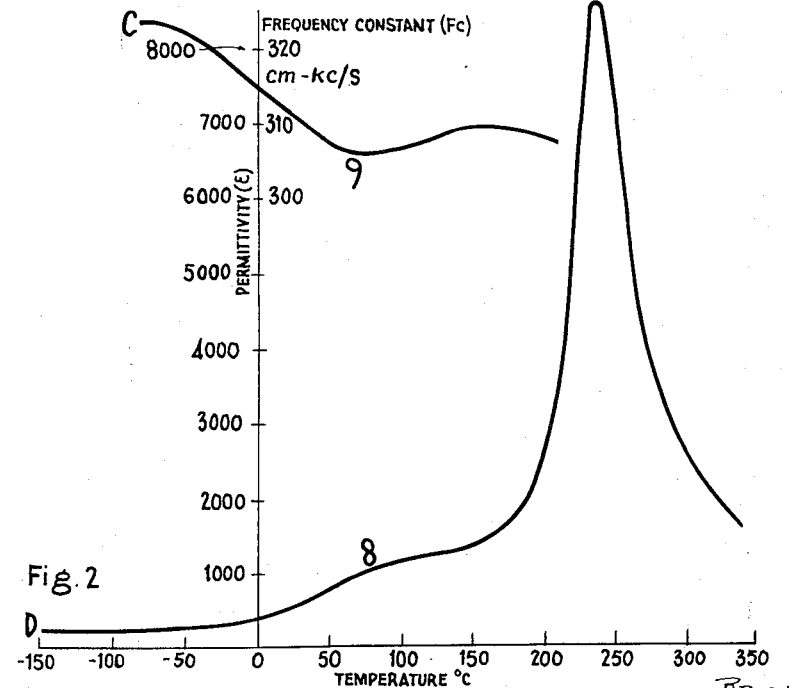

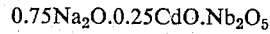

and Figure 2 shows the frequency constant-temperature curve (C) and the permittivity- temperature curve (D) for a specimen of sodium lead metaniobate of the composition $0.75Na_2O.0.25PbO.1.05Nb_2O_5$. The Curie points of the two materials are the temperatures at which the permittivity maxima, indicated at 1 and 7 respectively, occur, and the secondary transition points are indicated by the maximum 2 and inflexion 8 respectively in the permittivity curves B and D: it will be observed that the secondary transition point is not clearly defined in the case of the sodium lead niobate material, the inflexion 8 in curve D extending over a considerable temperature range. Two sharply-defined minima occur in the frequency constant curve A for the sodium cadmium niobate, one, indicated at 4, at a temperature slightly below the Curie point, and the other indicated at 5, at approximately the secondary transition temperature shown in the permittivity curve B; the frequency constant curve C for the sodium lead niobate shows a much less clearly defined minimum, at 9, over approximately the same temperature range as the inflexion 8 in the permittivity curve D. The minor inflexions occurring at 3 and 6 in curves B and A respectively indicate the presence of a small proportion of a cadmium niobate phase of composition $Cd_2Nb_2O_7$.

The curves shown in Figures 1 and 2 thus illustrate the difference between sodium cadmium niobates and sodium lead niobates in respect of the constancy of permittivity and resonant frequency over temperature ranges in the region of the secondary transition temperature, these properties in the case of this particular sodium lead niobate varying only to a relatively small extent over a wide temperature range, from about 25° C. to 150° C. for the permittivity and from about 25° C. to 200° C. for the resonant frequency. This constancy of electrical properties over a wide temperature range renders the sodium lead niobates particularly useful for some practical applications; the actual range of temperatures over which this effect is obtained may be modified by changing the composition of the material: for example it may be raised by reducing the proportion of lead metaniobate in the material or it may be lowered by replacing part of the niobium by tantalum.

For some applications the advantages of the effects of the substitution of sodium, cadmium and niobium by potassium, lead and tantalum respectively, on the secondary transition temperature and on the constancy of electrical properties, especially the resonant frequency over ranges of temperatures, will outweigh any deleterious effects in other respects, such as reductions in the permittivity and electromechanical coupling coefficient, which may result from such substitutions.

As mentioned above it is desirable that the materials should be as dense and nonporous as possible, the density obtained in each case being an indication of the completeness of sintering achieved during the firing process. In general, the density of the materials increases with increasing proportions of cadmium oxide and/or lead oxide and/or tantalum oxide.

The ferroelectric materials of the invention possess electrical and mechanical loss characteristics similar to those of previously known ferroelectric materials.

The preparation and properties of a number of specific ceramic dielectric materials in accordance with the invention will now be described by way of example, and the properties of some series of materials will be shown in tabular form. The stated compositions of each material described below represents the overall composition of the material, based on the proportions of the various oxides contained in the starting materials, without indicating whether the material consists of a single solid solution phase or of a mixture of phases.

It will be appreciated that the properties of a material in accordance with the invention vary to some extent for different specimens of the same nominal composition, as a result of slight variations in the details of the preparative procedure employed, especially in the firing procedure, which variations affect the degree of homogeneity of the product and the amount of cadmium oxide and/or lead oxide incorporated in solid solution. The properties which are particularly subject to such variation are the Curie temperature and secondary transition temperature, and maximum and room temperature permittivities. Accordingly it is to be understood that all figures given in this specification for the properties of specific materials are those obtained for a particular specimen in each case, and would not necessarily be reproduced exactly for another specimen of the same nominal composition and prepared by substantially the same method, although they would be of a similar order.

EXAMPLE 1

For the preparation of a sodium cadmium niobate of composition $0.9Na_2O.0.1CdO.Nb_2O_5$, sodium metaniobate and cadmium metaniobate are first prepared separately.

For the preparation of the sodium metaniobate, 32 grams of anhydrous sodium carbonate ($Na_2CO_3$) and 80 grams of niobium pentoxide ($Nb_2O_5$) are milled together and then mixed with 1.5% by weight of camphor as a temporary binder, pressed at 12 tons/sq. inch and the pressed mixture is fired at 1,000° C. for two hours. The cadmium metaniobate is prepared in a similar manner, starting with 12.8 grams of cadmium oxide (CdO) and 26.58 grams of niobium pentoxide, and firing at 1000° C. for one hour: in this case the pressed mixture of cadmium oxide and niobium pentoxide is enclosed in a silica vessel which also contains pressed discs of cadmium oxide, so that the said mixture is fired in an atmosphere consisting of a mixture of air and cadmium oxide vapour.

To produce the sodium cadmium niobate, 8.85 grams of sodium metaniobate and 1.185 grams of cadmium metaniobate are mixed together, milled to a small particle size under acetone, mixed with 1.5% by weight of camphor, and the mixture is pressed into discs under a pressure of 12 tons/sq. inch, the discs then being fired, in the presence of pressed discs of cadmium oxide, in a closed silica vessel containing air. During the firing process the temperature is raised from room temperature to 1250° C. in four hours and is held at this temperature for one hour, the sintered products thus produced being allowed to cool in the furnace.

EXAMPLE 2

Sodium cadmium niobate of composition $$0.8Na_2O.0.2CdO.Nb_2O_5$$

is prepared by the method described in Example 1, employing sodium metaniobate and cadmium metaniobate in the respective quantities of 7.86 grams and 2.37 grams, the preparation of the separate niobates, the mixing, pressing and firing all being carried out as described in Example 1.

EXAMPLE 3

For the preparation of sodium cadmium niobate of composition $0.75Na_2O.0.25CdO.Nb_2O_5$, the method employed is the same as that described in Examples 1 and 2, with the difference that the amounts of sodium metaniobate and cadmium metaniobate employed are respectively 7.375 grams and 2.96 grams.

The product obtained according to Example 3 consists substantially of a single solid solution phase and is of tetragonal crystal form, the lattice parameters of the unit cell, determined by X-ray analysis, being as follows:

$$c_0 = 3.915 \text{A}.$$
$$a_0 = 3.892 \text{A}.$$

The sintered discs obtained by the method of the above three examples consist of hard, finely crystalline, non-porous materials. Silver electrodes may be formed on the opposing parallel faces of the discs in well-known manner, by applying to said faces a coating of a suspension of silver powder in a suitable liquid medium, drying the coating and baking the coated disc at 700° C. for about 20 minutes. The discs thus provided with electrodes can be polarised to impart remanent piezoelectricity thereto, by subjecting them to the action of a unidirectional electric field of strength 20 to 30 kv./cm., under oil, at room temperature for at least ten minutes.

The properties of a number of specific materials in the series $(1-x)Na_2O.xCdO.Nb_2O_5$, prepared as described in the above examples, in which the values of $x$ range from 0.05 to 0.30 mole, are given in Table 1: this table thus indicates the variations with composition of the permittivity at room temperature ($E_{RT}$) maximum permittivity ($E_{max}$), Curie temperature ($T_C$), secondary transition temperature ($T_2$), radial electro-mechanical coupling coefficient ($K\%$) at room temperature, and density ($d$). The corresponding properties of pure sodium metaniobate and of the material in which $x$ has the value of 0.02 mole are given for comparison. The temperature at which each composition was fired is also given: in each case the material was raised to the specified temperature in about four hours, was held at that temperature for two hours, and was allowed to cool to room temperature in the furnace.

Table 1

| $x$ (mole) | Firing temp. (° C.) | $E_{RT}$ | $E_{max}$ | $T_C$ (° C.) | $T_2$ (° C.) | K (percent) | $d$ |
|---|---|---|---|---|---|---|---|
| 0 | 1,300 | 230 | 1,200 | 330 | -------- | -------- | 3.6 |
| 0.02 | 1,250 | 230 | 2,700 | 375 | 200 | -------- | 3.9 |
| 0.05 | 1,250 | 500 | 4,000 | 375 | 60 | 4 | 4.2 |
| 0.10 | 1,250 | 1,000 | 4,100 | 320 | 75 | 11 | 4.3 |
| 0.15 | 1,250 | 1,400 | 8,500 | 285 | 50 | 18 | 4.3 |
| 0.20 | 1,250 | 2,300 | 10,000 | 250 | 20 | 25 | 4.4 |
| 0.25 | 1,250 | 3,500 | 15,000 | 220 | 5 | 34 | 4.5 |
| 0.30 | 1,200 | 2,700 | 11,000 | 210 | −25 | 32 | 4.6 |

EXAMPLE 4

This example, and the following two examples, describe the preparation of sodium lead niobates, for which sodium metaniobate and lead metaniobate are employed as starting materials.

The sodium metaniobate is prepared in the manner described in Example 1. Lead metaniobate is prepared similarly by mixing 22 grams of lead oxide (PbO) and 32 grams of niobium pentoxide, pressing, and firing at 1050° C. for two hours: the lead metaniobate thus formed contains 0.2 mole excess $Nb_2O_5$ over that required to give the exact stoichiometric composition of lead metaniobate $PbNb_2O_6$.

For the preparation of a sodium lead niobate of the composition $0.83Na_2O.0.17PbO.1.034Nb_2O_5$, a mixture of 10.9 grams of sodium metaniobate and 3.63 grams of lead metaniobate, prepared as described above, is pressed, together with 1.5% by weight of camphor, under 12 tons/sq. inch, and the pressed discs are fired at 1300° C. for two hours in air.

EXAMPLE 5

A sodium lead niobate of composition $$0.75Na_2O.0.25PbO.1.05Nb_2O_5$$

is prepared by the method described in Example 4, the starting materials being 9.85 grams of sodium metaniobate and 5.35 grams of lead metaniobate, both of which are prepared as described above, and the firing being carried out at 1250° C. for two hours.

EXAMPLE 6

For the preparation of a sodium lead niobate of composition $0.65Na_2O.0.35PbO.1.07Nb_2O_5$, the method described in Example 4 is employed, using 8.53 grams of sodium metaniobate and 7.49 grams of lead metaniobate, and firing at 1250° C. for two hours.

The product obtained according to Example 6 consists substantially of a single solid solution phase and is of tetragonal crystal form, the lattice parameters of the unit cell, determined by X-ray analysis, being as follows:

$$c_0 = 3.948 \text{A}$$
$$a_0 = 3.922 \text{A}$$

The discs of sodium lead niobate prepared in accordance with Examples 4, 5 and 6 are similar in appearance to the sodium cadmium niobates described above; these discs can be provided with silver electrodes, and polarised by the application of a unidirectional electric field of 20–30 kv./cm., under oil, for at least ten minutes at a temperature in the range of 150° C. to 200° C.

The properties of a number of specific sodium lead niobate materials which we have prepared by the method described in the above Example 4, using appropriate proportions of starting materials, in which the value of $x$ ranges from 0.05 to 0.75 mole, are shown in Table 2 in a similar manner to the presentation of the properties of sodium cadmium niobates in Table 1.

Table 2

| $x$ mole | Firing temp. (° C.) (Time 2 hours) | $E_{RT}$ | $E_{max}$ | $T_C$ (° C.) | $T_2$ (° C.) | K (percent) | $d$ |
|---|---|---|---|---|---|---|---|
| 0.05 | 1,300 | 250 | 2,000 | 300 | -------- | -------- | 3.46 |
| 0.10 | 1,300 | 300 | 7,100 | 285 | 175 | 9 | 4.01 |
| 0.17 | 1,300 | 350 | 6,900 | 265 | 100 | 12 | 4.22 |
| 0.20 | 1,250 | 400 | 8,600 | 245 | 85 | 21 | 4.34 |
| 0.25 | 1,250 | 500 | 8,600 | 235 | 75 | 19 | 4.52 |
| 0.35 | 1,250 | 700 | 8,800 | 180 | 25 | 16 | 4.75 |
| 0.50 | 1,200 | 1,200 | 5,500 | 180 | -------- | -------- | 4.78 |
| 0.75 | 1,200 | 900 | 3,600 | 325 | -------- | -------- | 5.35 |

The following two examples described the preparation of materials in which a part of the sodium is replaced by potassium.

EXAMPLE 7

A material of composition $$2.4Na_2O.0.6K_2O.1CdO.4Nb_2O_5$$

is prepared by pressing and sintering a mixture of sodium metaniobate, potassium metaniobate and cadmium metaniobate.

The sodium metaniobate and cadmium metaniobate are prepared in the manner described in Example 1, and potassium metaniobate is prepared by a similar method, employing 49.5 grams of anhydrous potassium carbonate ($K_2CO_3$) and 80 grams of niobium pentoxide as starting materials, this mixture, after pressing, being fired at 1,000° C. for two hours.

For the preparation of the sodium potassium cadmium niobate of the composition specified above, a mixture of 7.8 grams sodium metaniobate, 2.2 grams of potassium metaniobate and 3.9 grams of cadmium metaniobate, with 1.5% by weight of camphor, is pressed into discs which are then fired in the presence of discs of cadmium oxide, in a closed silica vessel containing air, at 1150° C. for two hours.

EXAMPLE 8

A sodium potassium cadmium niobate of composition $1.5Na_2O.1.5K_2O.1CdO.4Nb_2O_5$, is prepared in a similar manner to the material described in Example 7 using 4.9 grams of sodium metaniobate, 5.4 grams of potassium metaniobate and 3.9 grams of cadmium metaniobate, and the final firing step being carried out at 1100° C.

In each of the preparations described in Examples 1 to 8 inclusive, the method employed is that involving the preformation of the constituent metaniobates of the required material; however, each of those materials may be made by the alternative method in which all the constituent oxides, or compounds decomposable by heat to form the oxides, such as the carbonates, are mixed together initially.

The properties of the materials whose preparation is described in Examples 7 and 8 are shown in Table 3, in which the symbols have the same significance as in Tables 1 and 2.

Table 3

| Example | Firing temp. (° C.) | $E_{RT}$ | $E_{max}$ | $T_C$ (° C.) | $T_2$ (° C.) | K (percent) | d |
|---|---|---|---|---|---|---|---|
| 7 | 1,150 | 800 | 2,000 | 230 | 20 | 15 | 3.47 |
| 8 | 1,100 | 600 | 1,500 | 350 | 100 | 6 | 3.70 |

The following six examples describe the preparation of materials in which the niobium is partially replaced by tantalum. These examples are presented in the form of a table, Table 4, in which the Nb:Ta ratio, the composition, the weights of the ingredients, the prefiring temperature and the final firing temperature are indicated. In each case the method of preparation differs from the methods described in the previous examples, since it does not involve pre-forming of the respective niobates and tantalates, but consists in the formation of a mixture of all the ingredients in the form of carbonates and oxides, prefiring this mixture at a temperature in the range of 1,000 to 1100° C., milling the pre-fixed mixture to small particle size, pressing the powdered mixture thus obtained, with 1.5% by weight of camphor, under a pressure of 12 tons/sq. inch, and firing at the temperature indicated in the last column of the table for two hours, the compounds containing cadmium being fired in the presence of cadmium oxide vapour in the manner described in Examples 1 and 7.

It is to be understood that in each of Examples 9 to 14 as in the previous examples, the final firing temperature is attained over a heating period of four hours, and after being maintained at this temperature for the time specified the product is allowed to cool to room temperature in the furnace.

Table 4

| Example | Nb/Ta ratio | Composition | Wt. $Na_2CO_3$, g. | Wt. CdO, g. | Wt. PbO, g. | Wt. $Nb_2O_5$, g. | Wt. $Ta_2O_5$, g. | Prefire temp., °C. | Final fire temp., °C. |
|---|---|---|---|---|---|---|---|---|---|
| 9 | 95/5 | $3Na_2O.CdO.3.8Nb_2O_5.0.2Ta_2O_5$ | 3.18 | 1.28 | | 10.1 | 0.88 | 1,050 | 1,250 |
| 10 | 90/10 | $3Na_2O.CdO.3.6Nb_2O_5.0.4Ta_2O_5$ | 3.18 | 1.28 | | 9.57 | 1.77 | 1,050 | 1,250 |
| 11 | 75/25 | $3Na_2O.CdO.3Nb_2O_5.Ta_2O_5$ | 3.18 | 1.28 | | 7.97 | 4.42 | 1,000 | 1,300 |
| 12 | 95/5 | $3Na_2O.PbO.4.0Nb_2O_5.0.2Ta_2O_5$ | 3.18 | | 2.23 | 10.63 | 0.88 | 1,050 | 1,250 |
| 13 | 90/10 | $3Na_2O.PbO.3.8Nb_2O_5.0.4Ta_2O_5$ | 3.18 | | 2.23 | 10.2 | 1.77 | 1,050 | 1,300 |
| 14 | 75/25 | $3Na_2O.PbO.3.15Nb_2O_5.1.05Ta_2O_5$ | 3.18 | | 2.23 | 8.38 | 4.65 | 1,050 | 1,300 |

The products of Examples 7 to 14 inclusive are all well-sintered materials of homogeneous texture and low porosity. Discs of these materials may be provided with silver electrodes and polarised by similar methods to those described above in connection with Examples 1 to 6, the electric field being applied for at least ten minutes at room temperature: the temperature is not critical.

X-ray examination of the materials prepared in accordance with Examples 11 and 14 shows that each of these materials consists substantially of a single solid solution phase of substantially cubic crystal form, the lattice parameters of the unit cell being as follows:

Example 11: $a_0 = c_0 = 3.8942 \pm 0.0005A$
Example 14: $a_0 = c_0 = 3.9228 \pm 0.0005A$ The properties of the materials of Examples 9 to 14 are given in Table 5, the symbols having the same significance as in Tables 1, 2 and 3.

Table 5

| Example | $E_{RT}$ | $E_{max}$ | $T_C$ (° C.) | $T_2$ (° C.) | K (Percent) | d |
|---|---|---|---|---|---|---|
| 9 | 1,500 | 7,200 | 170 | −15 | 15 | 3.97 |
| 10 | 2,000 | 6,800 | 135 | −25 | 14 | 4.16 |
| 11 | 7,000 | 9,000 | 50 | | 7 | 4.62 |
| 12 | 500 | 8,500 | 205 | | 14 | 4.25 |
| 13 | 2,400 | 10,000 | 130 | | 12 | 4.34 |
| 14 | 2,600 | 2,900 | 45 | | 1 | 4.54 |

In the cases of Examples 11 and 14, the secondary transition temperatures have not been precisely determined but are considerably below room temperature. In the cases of Examples 12 and 13 the secondary transitions occur at approximately room temperature: in those materials, the variation of properties at the secondary transition is quite small.

I claim:

1. A ceramic dielectric material which has a stoichiometric composition substantially corresponding to the formula $(1-x)L_2O.xMO.R_2O_5$, wherein L is sodium which may be partially replaced by potassium, M is a metal of the group consisting of cadmium and lead, R is niobium which may be partially replaced by tantalum, and $x$ has a value in the range of 0.05 mole to 0.80 mole, L consisting wholly of sodium if lead is present.

2. A ceramic dielectric material according to claim 1 wherein the proportion of the sodium oxide replaced by potassium oxide is not greater than 50 mol. percent.

3. A ceramic dielectric material according to claim 2 wherein the proportion of the sodium oxide replaced by potassium oxide is not greater than 20 mol. percent.

4. A ceramic dielectric material according to claim 1 wherein the proportion of niobium pentoxide replaced by tantalum pentoxide is not greater than 25 mol. percent.

5. A ceramic dielectric material according to claim 1 wherein at least 50 mol. percent of L is sodium, M consists of cadmium only, and $x$ has a value in the range of 0.05 mole to 0.5 mole, and which material possesses ferroelectric properties.

6. A ceramic dielectric material according to claim 5, wherein L is sodium only and $x$ has a value in the range of 0.15 mole to 0.30 mole.

7. A ceramic dielectric material according to claim 6 wherein $x$ has a value of 0.25 mole.

8. A ceramic dielectric material according to claim 1 wherein L consists of sodium only, M consists of lead only, and $x$ has a value in the range of 0.1 mole to 0.4 mole, and which material possesses ferroelectric properties.

9. A ceramic dielectric material according to claim 8, wherein $x$ has a value between 0.25 mole and 0.35 mole.

10. A ceramic dielectric material possessing ferroelectric properties and consisting substantially of a single solid solution phase having the composition $0.75Na_2O.0.25CdO.Nb_2O_5$.

11. A ceramic dielectric material possessing ferroelectric properties and consisting substantially of a single solid solution phase having the composition $0.75Na_2O.0.25PbO.1.05Nb_2O_5$.

12. A method of manufacturing a ceramic dielectric material according to claim 1 which comprises forming a mixture of compounds such that on heating, a mixture of the constituent oxides of the material, in the required proportions, is produced, said compounds being in a finely divided state, pressing the mixture with a temporary binder, prefiring the pressed mixture at a temperature in the range of 1000° C. to 1100° C., reducing the prefired mixture to powder, pressing the powder to form compacts of the required shapes, and sintering the compacts at a temperature in the range of 1100° C. to 1350° C.

13. A method of manufacturing a ceramic dielectric material according to claim 1 which comprises preforming the constituent metaniobates, and metatantalates if required, milling the said metaniobates (and metatantalates if present) together in the required proportions to produce a finely powdered mixture, pressing the mixture to form compacts of the required shapes, and sintering the compacts at a temperature in the range of 1100° C. to 1350° C.

14. A method according to claim 12 wherein the initial mixture employed includes up to 20 mol. percent excess of niobium pentoxide above that required to produce the metaniobate composition.

15. A method according to claim 13 wherein the initial mixture employed includes up to 20 mol. percent excess of niobium pentoxide above that required to produce the metaniobate composition.

References Cited in the file of this patent

UNITED STATES PATENTS

| | | |
|---|---|---|
| 2,584,324 | Bousky | Feb. 5, 1952 |
| 2,598,707 | Matthias | June 3, 1952 |
| 2,729,757 | Goodman | Jan. 3, 1956 |
| 2,731,419 | Goodman | Jan. 17, 1956 |